United States Patent
Chen et al.

(10) Patent No.: US 12,183,931 B2
(45) Date of Patent: Dec. 31, 2024

(54) CURRENT COLLECTING MEMBER, SECONDARY BATTERY, AND METHOD FOR MANUFACTURING SECONDARY BATTERY

(71) Applicant: CONTEMPORARY AMPEREX TECHNOLOGY (HONG KONG) LIMITED, Hong Kong (CN)

(72) Inventors: Yuanbao Chen, Ningde (CN); Quankun Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 778 days.

(21) Appl. No.: 17/230,988

(22) Filed: Apr. 14, 2021

(65) Prior Publication Data
US 2021/0234175 A1    Jul. 29, 2021

Related U.S. Application Data

(63) Continuation of application No. PCT/CN2019/112513, filed on Oct. 22, 2019.

(51) Int. Cl.
*H01M 4/70* (2006.01)
*H01M 10/04* (2006.01)
(Continued)

(52) U.S. Cl.
CPC ............. *H01M 4/70* (2013.01); *H01M 10/04* (2013.01); *H01M 50/50* (2021.01); *H01M 50/533* (2021.01); *H01M 50/536* (2021.01)

(58) Field of Classification Search
CPC ............. H01M 10/04; H01M 10/0431; H01M 10/0587
See application file for complete search history.

(56) References Cited

U.S. PATENT DOCUMENTS

2013/0330593 A1*  12/2013  Kim ................. H01M 10/0413
                                              429/179
2019/0221819 A1*  7/2019  Xing ................. H01M 50/531

FOREIGN PATENT DOCUMENTS

CN     103490039 A    1/2014
CN     206742364 U    12/2017
(Continued)

OTHER PUBLICATIONS

The extended European search report for EP Application No. 19874930.1, dated Nov. 15, 2021, 8 pages.
(Continued)

*Primary Examiner* — Brittany L Raymond
(74) *Attorney, Agent, or Firm* — East IP P.C.

(57) ABSTRACT

This application provides a current collecting member, a secondary battery, and a method for manufacturing a secondary battery. The current collecting member includes a substrate and a support plate, the substrate is disposed on a side of a body of the electrode assembly in the transverse direction and extends in a direction perpendicular to the transverse direction, the support plate extends from an outer end of the substrate in the longitudinal direction and folds back to a side of the substrate farther from the body. The support plate includes a bending portion and a connecting portion, the bending portion is connected to the substrate and bent into an arc shape, and the connecting portion extends from an end of the bending portion farther from the substrate; and a first tab of the electrode assembly is connected to the connecting portion and bent along a surface of the bending portion.

16 Claims, 5 Drawing Sheets

(51) Int. Cl.
  *H01M 50/50*    (2021.01)
  *H01M 50/533*   (2021.01)
  *H01M 50/536*   (2021.01)

(56) References Cited

FOREIGN PATENT DOCUMENTS

| CN | 108258180 A | | 7/2018 |
|---|---|---|---|
| CN | 108598353 | * | 9/2018 |
| CN | 108598353 A | | 9/2018 |
| CN | 208819970 U | | 5/2019 |
| EP | 2675000 A1 | | 12/2013 |
| EP | 3512004 A1 | | 7/2019 |
| JP | 2012221719 A | | 11/2012 |

OTHER PUBLICATIONS

The International search report for PCT Application No. PCT/CN2019/112513, dated Jan. 19, 2020, 9 pages.
The First Office Action for European Application No. 19874930.1, dated Jun. 8, 2022, 5 pages.

* cited by examiner

CURRENT COLLECTING MEMBER, SECONDARY BATTERY, AND METHOD FOR MANUFACTURING SECONDARY BATTERY

This application is a continuation of International Application No. PCT/CN2019/112513, filed on Oct. 22, 2019, which claims priority to Chinese Patent Application No. 201821752622.X, filed on Oct. 26, 2018, both of which are incorporated herein by reference in their entireties.

TECHNICAL FIELD

This application relates to the battery field, and in particular, to a current collecting member, a secondary battery, and a method for manufacturing a secondary battery.

BACKGROUND

A secondary battery generally includes an electrode assembly, a housing, electrode terminals, and a current collecting member, and the current collecting member is configured to electrically connect the electrode assembly to the electrode terminals. In a process of forming the secondary battery, usually, tabs of the electrode assembly are first welded to the current collecting member, and then the current collecting member and the tabs are bent, to reduce space occupied by the current collecting member and the tabs. However, a sharp corner is likely to form at a bending position of the current collecting member, and when the secondary battery vibrates, the sharp corner is likely to pierce the tabs, thereby reducing a current flow capacity of the tabs and affecting performance of the secondary battery.

SUMMARY

In view of the problem described in Background, a purpose of the disclosure is to provide a secondary battery, so as to prevent splitting of a tab and ensure a current flow capability of the tab.

To achieve the foregoing objective, the disclosure provides a secondary battery, where the secondary battery includes an electrode assembly, a housing, a top cover assembly, and a current collecting member. The electrode assembly is accommodated in the housing and includes a body and a first tab, and the first tab extends from an end of the body in a transverse direction. The top cover assembly includes a top cover plate and a first electrode terminal disposed on the top cover plate, and the top cover plate is connected to the housing. The current collecting member is connected to the first tab and the first electrode terminal. The current collecting member includes a substrate and a support plate, the substrate is disposed on a side of the body in the transverse direction and extends in a direction perpendicular to the transverse direction, and the support plate extends from an outer end of the substrate in the longitudinal direction and folds back to a side of the substrate farther from the body. The support plate includes a bending portion and a connecting portion, the bending portion is connected to the substrate and bent into an arc shape, and the connecting portion extends from an end of the bending portion farther from the substrate; and the first tab is connected to the connecting portion and bent along a surface of the bending portion.

A first gap is reserved between the connecting portion and the substrate. Preferably, a first gap is gradually narrowed in a direction extending away from the bending portion. Further, in an embodiment, an end of the connecting portion farther from the bending portion comes in contact with the substrate.

There are two support plates, the two support plates respectively extend from both ends of the substrate in the longitudinal direction, and the two support plates are bent opposite to each other. In the longitudinal direction, a second gap is reserved between the connecting portions of the two support plates.

The current collecting member further includes a terminal connecting plate, and the terminal connecting plate is perpendicular to the substrate and connected to the first electrode terminal and the substrate.

A cross section of the bending portion is fan-shaped.

The substrate and the support plate are integrally formed.

The first tab includes a first part, a second part, and a third part, the first part extends from an end of the body in the transverse direction, the second part extends from an end of the first part farther from the body and is bent along the surface of the bending portion, and the third part extends from an end of the second part farther from the first part and is fastened to the connecting portion.

The disclosure has the following beneficial effects: when the support plate and the first tab are bent, an arc-shaped bending portion is formed at a bending position of the support plate in this application; therefore, a contact area between the first tab and the bending portion is relatively smooth, and there is no sharp corner, thereby reducing a probability of piercing the first tab; and in addition, the first tab is bent along the arc-shaped surface of the bending portion, which can reduce stress concentration of the first tab at the bending position, avoid splitting of the first tab, and ensure a current flow capacity of the first tab.

Herein, description of reference signs:

| | |
|---|---|
| 1. Electrode assembly | 31. Top cover plate |
| 11. Body | 32. First electrode terminal |
| 12. First tab | 33. Second electrode terminal |
| 121. First part | 4. Current collecting member |
| 122. Second part | 41. Substrate |
| 123. Third part | 42. Support plate |
| 13. Second tab | 421. Bending portion |
| 14. First electrode plate | 422. Connecting portion |

-continued

| | |
|---|---|
| 141. First coated area | 43. Terminal connecting plate |
| 142. First uncoated area | G1. First gap |
| 15. Second electrode plate | G2. Second gap |
| 16. Separator | X. Traverse direction |
| 2. Housing | Y. Longitudinal direction |
| 3. Top cover assembly | Z. Height direction |

DESCRIPTION OF EMBODIMENTS

The following clearly describes the technical solutions in the embodiments of this application with reference to the accompanying drawings in the embodiments of this application; and apparently, the described embodiments are merely some but not all of the embodiments of this application. The following description of at least one example embodiment is actually only for a purpose of illustration, and shall not be considered as any limitation on this application and application or use thereof. All other embodiments obtained by a person of ordinary skill in the art based on the embodiments of this application without creative efforts shall fall within the protection scope of this application.

In the description of this application, it should be understood that terms such as "first", "second", and "third" used to define components are only used for ease of distinguishing corresponding components; and unless otherwise specified, the foregoing terms have no special meanings, and therefore cannot be understood as a limitation on the protection scope of this application.

The secondary battery in this application may be a lithium-ion battery.

Figure 1:
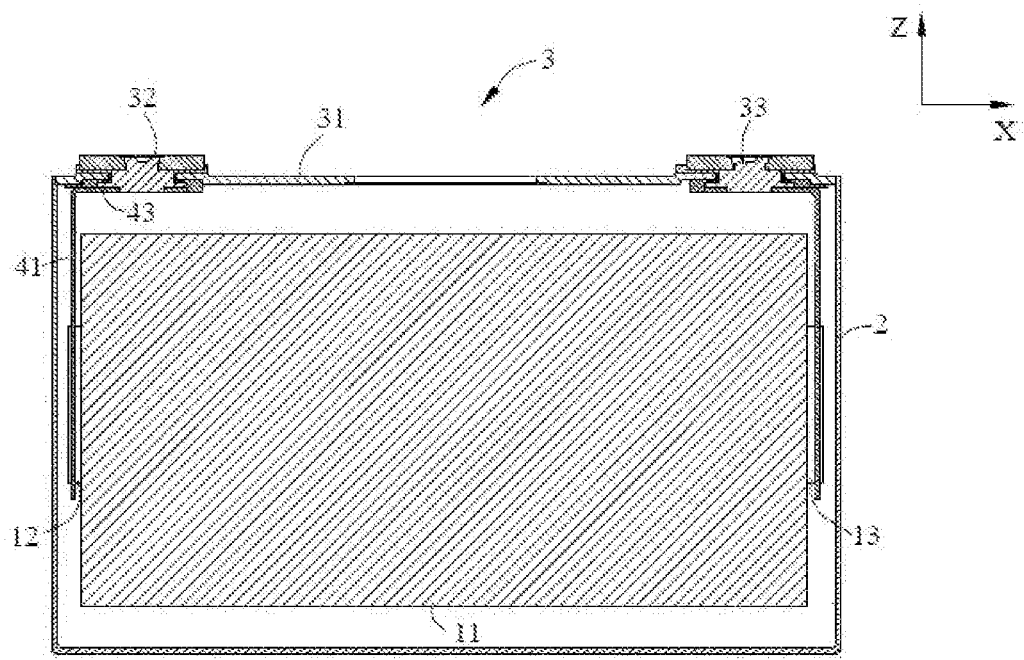
FIG. 1 is a cross-sectional view of a secondary battery according to the disclosure.
Figure 4:
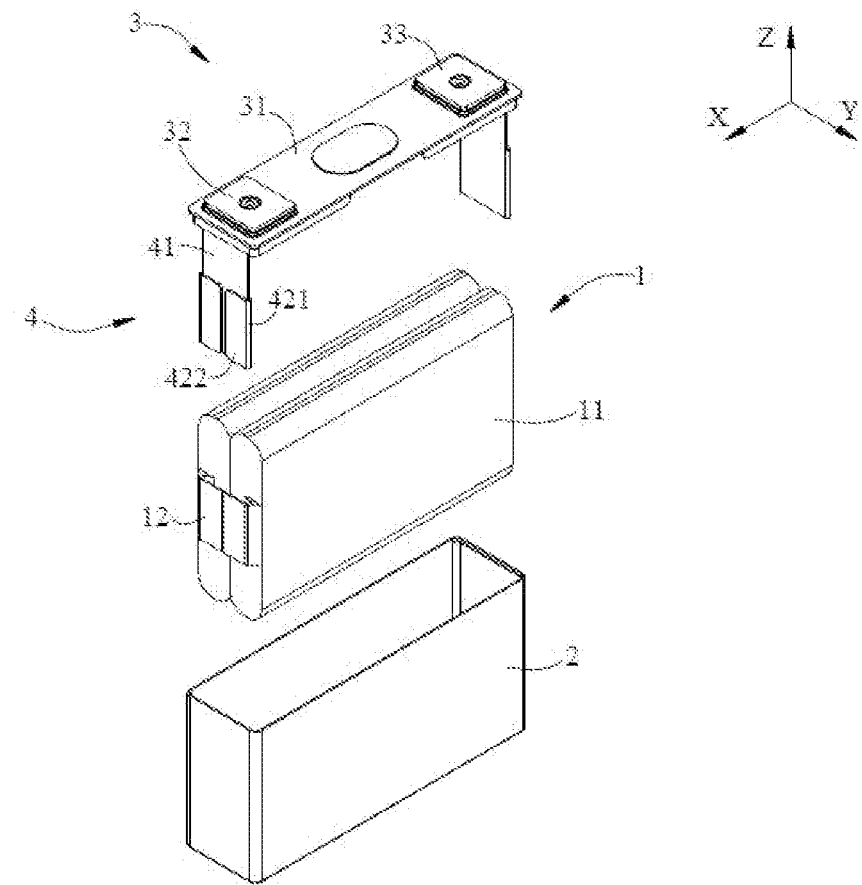
FIG. 4 is an exploded view of a secondary battery according to the disclosure.

Referring to FIG. 1 and FIG. 4, a secondary battery includes an electrode assembly 1, a housing 2, a top cover assembly 3, and a current collecting member 4.

Figure 2:
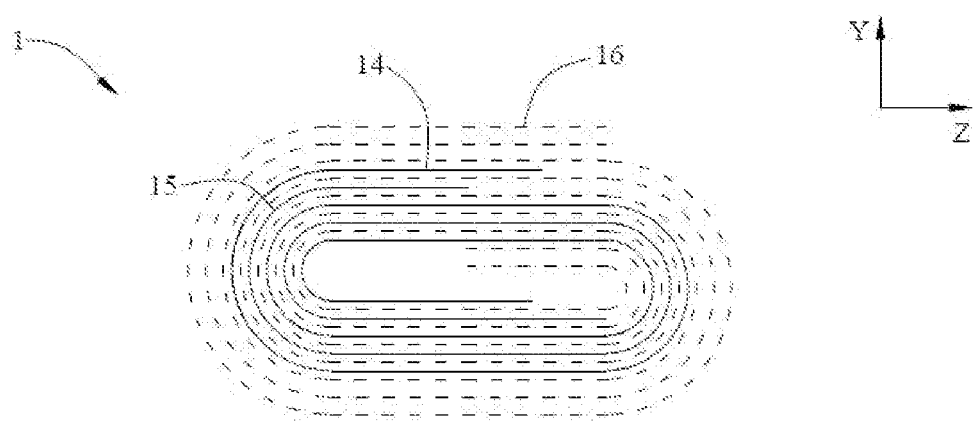
FIG. 2 is a cross-sectional view of a battery assembly of a secondary battery according to the disclosure.

Referring to FIG. 2, the electrode assembly 1 includes a first electrode plate 14, a second electrode plate 15, and a separator 16, and the separator 16 is disposed between the first electrode plate 14 and the second electrode plate 15. The electrode assembly 1 is formed by spirally winding the first electrode plate 14, the second electrode plate 15, and the separator 16, and an elliptical structure is formed by applying pressure. The electrode assembly 1 is a core component of the secondary battery for implementing charge and discharge functions.

The first electrode plate 14 includes a first current collector and a first active material layer coating a surface of the first current collector. The first electrode plate 14 may be a positive electrode plate, the first current collector is aluminum foil, and the first active material layer includes an active material such as lithium manganate or lithium-iron phosphate. The active material (such as lithium manganate or lithium-iron phosphate), a binder, a conductive agent, and a solvent may be made into a slurry, and then the slurry is applied onto two surfaces of the first current collector; and after the slurry becomes solidified, the first active material layer is formed.

Figure 3:
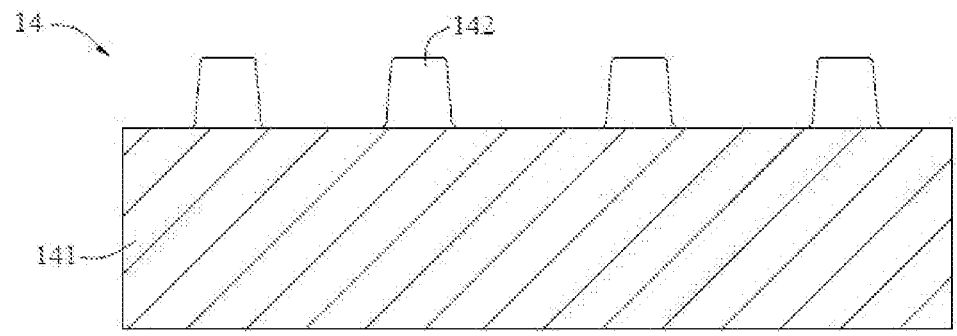
FIG. 3 is a schematic diagram of a first electrode plate according to the disclosure.

Only some areas of the first current collector are coated with the first active material layer. Referring to FIG. 3, the first active material layer and the area of the first current collector that is coated with the first active material layer form a first coated area 141 of the first electrode plate 14, and an area of the first current collector that is not coated with the first active material layer forms a first uncoated area 142 of the first electrode plate 14. There may be a plurality of first uncoated areas 142, and the plurality of first uncoated areas 142 may be arranged at intervals, and after the first electrode plate 14 is formed through winding, the plurality of first uncoated areas 142 are stacked together.

The second electrode plate 15 includes a second current collector and a second active material layer coating a surface of the second current collector, the second active material layer and an area of the second current collector that is coated with the second active material layer form a second coated area of the second electrode plate 15, and an area of the second current collector that is not coated with the second active material layer forms a second uncoated area of the second electrode plate 15. There may be a plurality of second uncoated areas, and the plurality of second uncoated areas may be arranged at intervals, and after the second electrode plate 15 is formed through winding, the plurality of second uncoated areas are stacked together. A structure of the second electrode plate 15 is similar to a structure of the first electrode plate 14; and a difference lies in that a material of the second current collector may be copper foil, and the second active material layer includes an active material such as graphite or silicon.

The separator 16 may be a polyethylene (PE) film, a polypropylene (PP) film, or a three-layer PP\PE\PP composite film.

After the electrode assembly 1 is formed through winding, the first coated area 141 of the first electrode plate 14, the separator 16, and the second coated area of the second electrode plate 15 form a body 11 of the electrode assembly 1, the plurality of first uncoated areas 142 of the first electrode plate 14 that are stacked together are used as a first tab 12 of the electrode assembly 1, and the plurality of second uncoated areas of the second electrode plate 15 that are stacked together are used as a second tab 13 of the electrode assembly 1.

A winding axis of the electrode assembly 1 is parallel to the transverse direction X, the first tab 12 extends from an end of the body 11 in the transverse direction X, and the second tab 13 extends from the other end of the body 11 in the transverse direction X.

Referring to FIG. 4, the housing 2 may be in a hexahedral shape or another shape. An accommodating cavity is formed inside the housing 2, to accommodate the electrode assembly 1 and an electrolyte. The housing 2 has an opening at an end, and the electrode assembly 1 may be placed into the accommodating cavity of the housing 2 through the opening. The housing 2 may be made of a conductive metal material, and in an embodiment, the housing 2 is made of aluminum or aluminum alloy with high reliability.

The top cover assembly 3 includes a top cover plate 31, a first electrode terminal 32, and a second electrode terminal 33. The top cover plate 31 is disposed on the housing 2 and covers the opening of the housing 2, to seal the electrode assembly 1 in the housing 2. The top cover plate 31 may be connected to the housing 2 through welding. The first electrode terminal 32 and the second electrode terminal 33 are disposed on the top cover plate 31, and the first electrode terminal 32 is electrically connected to the first tab 12, and the second electrode terminal 33 is electrically connected to the second tab 13.

The current collecting member 4 is connected to the first tab 12 and the first electrode terminal 32.

Figure 5:
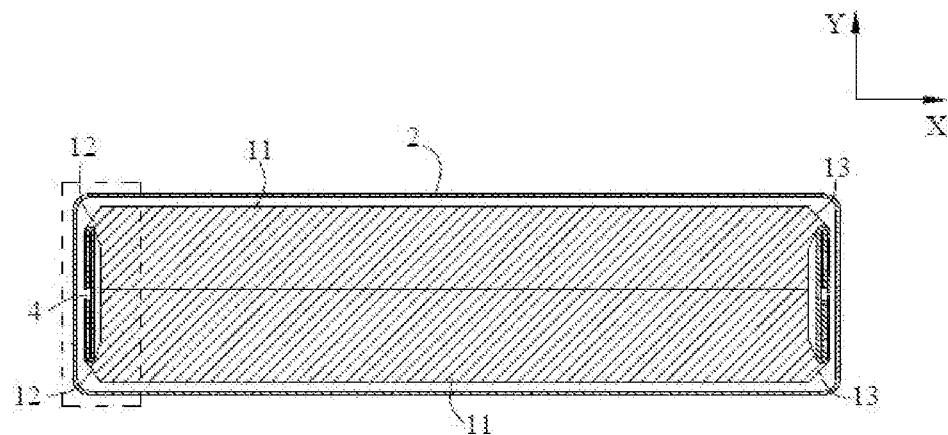
FIG. 5 is another cross-sectional view of a secondary battery according to the disclosure.
Figure 6:
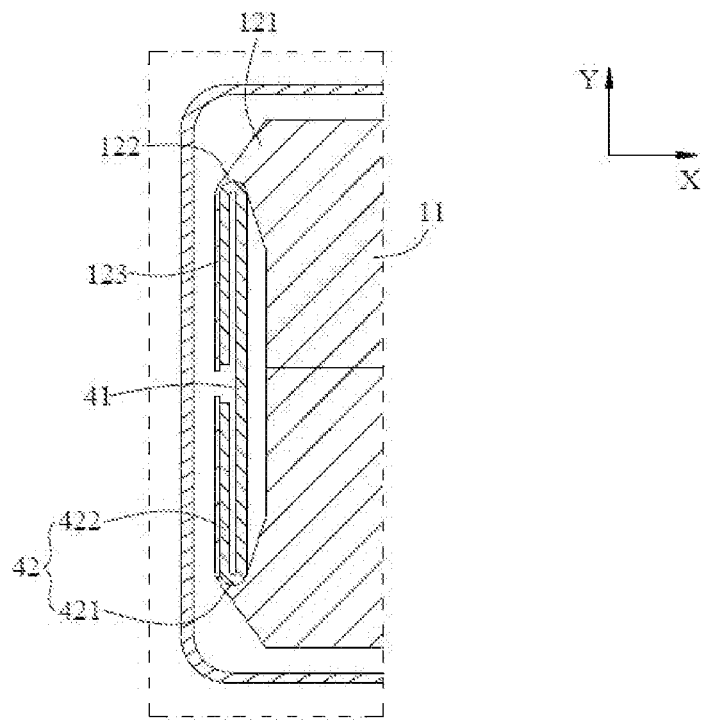
FIG. 6 is an enlarged view of a part in a dashed-line box of FIG. 5.

Specifically, referring to FIG. 4 to FIG. 6, the current collecting member 4 includes a substrate 41 and a support plate 42, and the substrate 41 is disposed on a side of the body 11 in the transverse direction X and extends in a direction perpendicular to the transverse direction X. The support plate 42 extends from an outer end of the substrate 41 in the longitudinal direction Y and folds back to a side of the substrate 41 farther from the body 11, and in the transverse direction X, the support plate 42 overlaps the substrate 41.

The support plate 42 includes a bending portion 421 and a connecting portion 422, the bending portion 421 is connected to the substrate 41 and bent into an arc shape, and the connecting portion 422 extends from an end of the bending portion 421 farther from the substrate 41. The first tab 12 is connected to the connecting portion 422 and bent along a surface of the bending portion 421. Preferably, the substrate 41 and the support plate 42 are integrally formed.

Figure 7:
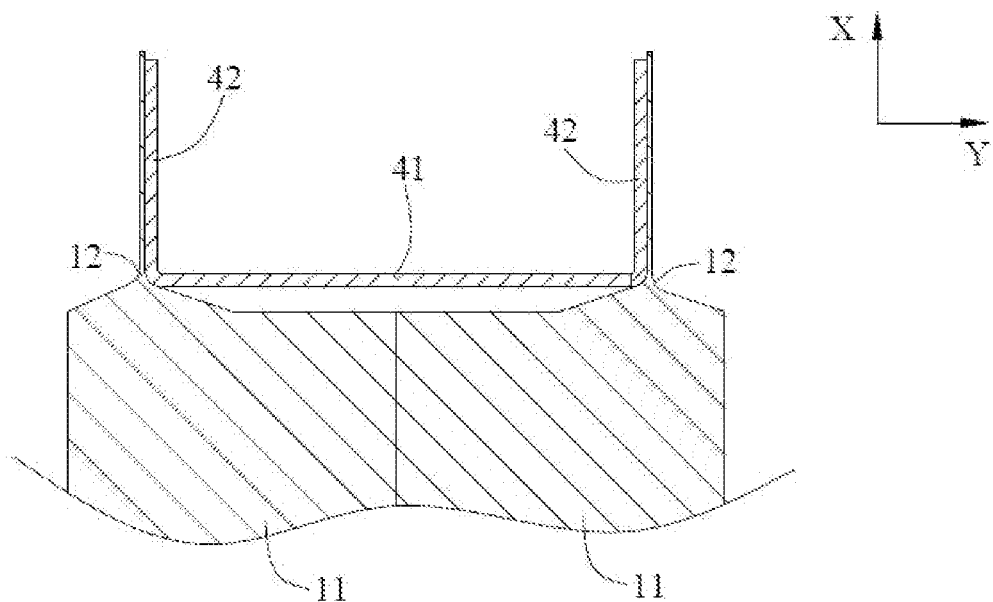
FIG. 7 is a schematic diagram of a secondary battery in a forming process according to the disclosure.

Referring to FIG. 7, to facilitate welding of the support plate 42 and the first tab 12, the current collecting member 4 is usually first bent into a U shape, and the support plate 42 is approximately perpendicular to the substrate 41 at that time; and after the welding of the support plate 42 and the first tab 12 is completed, the support plate 42 and the first tab 12 are then bent, to reduce space occupied by the support plate 42 in the transverse direction X.

When the support plate 42 and the first tab 12 are bent, an arc-shaped bending portion 421 is formed at a bending position of the support plate 42 in this application, and therefore, a contact area between the first tab 12 and the bending portion 421 is relatively smooth and free of sharp corners, thereby reducing a probability of piercing the first tab 12. In addition, the first tab 12 is bent along the arc-shaped surface of the bending portion 421, which can reduce stress concentration of the first tab 12 at the bending position, avoid splitting of the first tab 12, and ensure a current flow capacity of the first tab 12.

Referring to FIG. 1, the current collecting member 4 further includes a terminal connecting plate 43, and the terminal connecting plate 43 is perpendicular to the substrate 41 and connected to the first electrode terminal 32 and the substrate 41. The terminal connecting plate 43 may be connected to the first electrode terminal 32 through welding. The substrate 41 may be bent downward from an end of the terminal connecting plate 43 in the transverse direction X. The substrate 41, the support plate 42, and the terminal connecting plate 43 may be integrally formed.

Referring to FIG. 6, the first tab 12 includes a first part 121, a second part 122, and a third part 123, the first part 121 extends from an end of the body 11 in the transverse direction X, the second part 122 extends from an end of the first part 121 farther from the body 11 and is bent along the surface of the bending portion 421, and the third part 123 extends from an end of the second part 122 farther from the first part 121 and is fastened to the connecting portion 422.

The first tab 12 is formed by a plurality of first uncoated areas 142 that are stacked, and each of the first uncoated areas 142 is metal foil with a relatively small thickness. In the third part 123, the plurality of first uncoated areas 142 are fastened to the connecting portion 422 through ultrasonic welding. In the second part 122, the plurality of first uncoated areas 142 are bent along the bending portion 421; and if a sharp corner is formed at the bending portion 421, the first uncoated area 142 close to the bending portion 421 is likely to be pierced; and however, in this application, the bending portion 421 is arc-shaped, force between the bending portion 421 and the first uncoated area 142 is more even, and therefore, the first uncoated area 142 close to the bending portion 421 is unlikely to be pierced.

Figure 8:
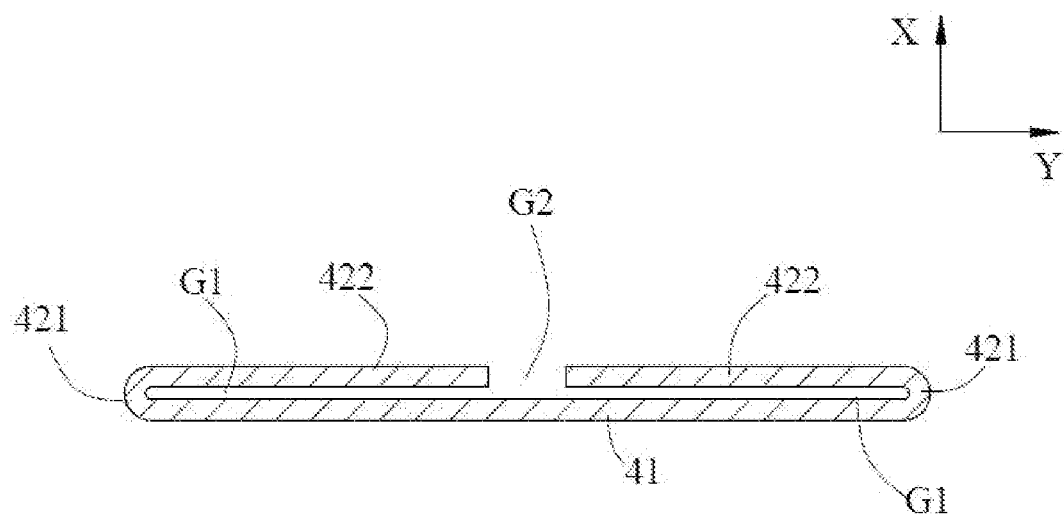
FIG. 8 is a cross-sectional view of a current collecting member of a secondary battery according to an embodiment of the disclosure.
Figure 9:
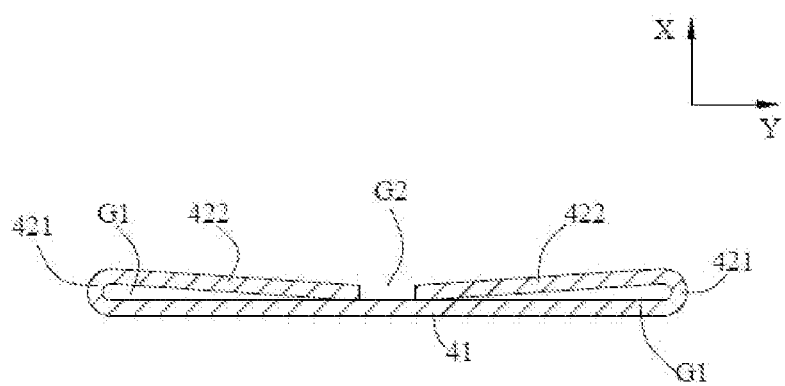
FIG. 9 is a cross-sectional view of a current collecting member of a secondary battery according to another embodiment of the disclosure.

Referring to FIG. 8 and FIG. 9, a cross section of the bending portion 421 is fan-shaped, and a surface of the bending portion 421 that is in contact with the second part 122 is an arc surface. With the arc surface, force between the bending portion 421 and the second part 122 is more even, to reduce stress concentration.

A first gap G1 is reserved between the connecting portion 422 and the substrate 41. Disposing the first gap G1 can increase a diameter of the bending portion 421, thereby improving a stress release effect and avoiding splitting of the first tab 12.

Preferably, referring to FIG. 9, the first gap G1 is gradually narrowed in a direction extending away from the bending portion 421, and in other words, the connecting portion 422 is inclined towards the substrate 41. When the connecting portion 422 is inclined, a curvature of the bending portion 421 may be increased (referring to FIG. 8, when the connecting portion 422 is parallel to the substrate 41, a central angle of the bending portion 421 is equal to 180 degrees; and referring to FIG. 9, when the connecting portion 422 is inclined, a central angle of the bending portion 421 is greater than 180 degrees), and a contact area between the bending portion 421 and the first tab 12 is increased, thereby dispersing stress more effectively and avoiding stress concentration.

In the secondary battery, to avoid contact between the electrode assembly 1 and the housing 2 and prevent a short circuit, an insulation plate is usually disposed between the electrode assembly 1 and the housing 2. In a forming process of the secondary battery, usually, the electrode assembly 1, the top cover assembly 3, and the current collecting member 4 are first assembled together, and then the electrode assembly 1 is installed into the housing 2; and in the process of installing the electrode assembly 1 into the housing, the current collecting member 4 and the first tab 12 are likely to be in contact with the insulation plate. If the connecting portion 422 is parallel to the substrate 41, in the process of installing the electrode assembly 1 into the housing, a free end (with a sharp corner) of the first tab 12 is likely to be in contact with the insulation plate, to damage the insulation plate and affect safety performance of the secondary battery. In addition, if the connecting portion 422 is inclined towards the substrate 41, in the process of installing the electrode assembly 1 into the housing, the second part 122 of the first tab 12 is likely to be in contact with the insulation plate; and however, because the second part 122 is integrally bent into an arc shape and a surface is relatively smooth, the insulation plate is unlikely to be damaged, thereby improving the safety performance of the secondary battery.

Further, an end of the connecting portion 422 farther from the bending portion 421 comes in contact with the substrate 41, so that the curvature of the bending portion 421 can be maximized to avoid stress concentration.

To increase a capacity of the secondary battery, a plurality of electrode assemblies 1 are usually disposed and arranged in the longitudinal direction Y. There are two support plates 42, the two support plates 42 respectively extend from both ends of the substrate 41 in the longitudinal direction Y, and the two support plates 42 are bent opposite to each other. First tabs 12 of some electrode assemblies 1 may be welded to one support plate 42, and first tabs 12 of remaining electrode assemblies 1 may be welded to the other support plate 42.

In the longitudinal direction Y, a second gap G2 is reserved between the connecting portions 422 of the two support plates 42. Reserving the second gap G2 between the two support plates 42 can avoid overlapping of the two support plates 42 during bending, and prevent the support plates 42 from occupying excessive space in the transverse direction X.

In addition, the secondary battery in the foregoing embodiments can be manufactured by using the following manufacturing method:

S1: Bend a current collecting plate to form a bending structure, where the bending structure includes a substrate 41 and a support plate 42 that are bent toward each other, and the support plate 42 extends from an outer end of the substrate 41 in the longitudinal direction Y;

In this step, the current collecting plate has a metal plate structure and is electrically conductive, and after the current collecting plate is bent to form a bending structure, as shown in FIG. 7, the substrate 41 and the support plate 42 that are formed are approximately perpendicular. In addition, when the bending structure is viewed at an angle shown in FIG. 7, a surface of the substrate 41 is perpendicular to the traverse direction X, and the surface of the support plate 42 is approximately parallel to the traverse direction X. During manufacturing of the secondary battery, the bending structure is placed on a side of the body 11 of the electrode assembly 1 in the traverse direction X.

When the secondary battery includes one electrode assembly 1, the bending structure merely needs to include one support plate 42, and therefore, the bending structure is approximately L-shaped. When the secondary battery includes a plurality of electrode assemblies 1 that are arranged in the longitudinal direction Y, the bending structure includes two support plates 42, and both the two support plates 42 extend from two ends of the substrate 41 in the longitudinal direction Y, and therefore, the bending structure is approximately U-shaped.

S2: Connect the first tab 12 to the support plate 42.

As shown in FIG. 7, in the electrode assembly 1, the first tab 12 of the electrode assembly 1 protrudes from the body 11, and extends approximately in the transverse direction X, which is approximately the same as an extension direction of the support plate 42, and in this case, the first tab 12 may be attached to the support plate 42, with a relatively large attaching area between the first tab 12 and the support plate 42.

In this step, the first tab 12 and the support plate 42 may be connected in a manner such as laser welding. In addition, when the secondary battery includes a plurality of electrode assemblies 1, first tabs 12 of some electrode assemblies 1 are welded to one support plate 42, and first tabs 12 of some other electrode assemblies 1 are welded to the other support plate 42.

S3: Bend the first tab 12 and the support plate 42 that are connected, so that the support plate 42 folds back to a side of the substrate 41 in the transverse direction X, where after being bent, the support plate 42 includes an arc-shaped bending portion 421 and the connecting portion 422, the bending portion 421 is connected to the substrate 41, and the connecting portion 422 extends from an end of the bending portion 421 farther from the substrate 41, to form the current collecting member 4.

In the foregoing steps, after the first tab 12 is connected to the support plate 42, functions of the first tab 12 and the first electrode terminal 32 can be implemented by using the bending structure; however, in this case, the first tab 12 and the support plate 42 extend in the transverse direction X; and to reduce space occupied by the secondary battery in the transverse direction X, the first tab 12 and the support plate 42 are bent again, so that the support plate 42 is close to the substrate 41.

In addition, when the support plate 41 and the first tab 12 are bent, because the arc-shaped bending portion 421 is present at a bending position of the support plate 41, a contact area between the first tab 12 and the bending portion 421 is smooth and free of sharp corners, thereby reducing a probability of piercing the first tab 12; and in addition, the first tab 12 is bent along the arc-shaped surface of the bending portion 421, which can reduce stress concentration of the first tab 12 at the bending position, avoid splitting of the first tab 12, and ensure a current flow capacity of the first tab 12.

In this step, when the secondary battery includes a plurality of electrode assemblies 1, the two support plates 42 are bent opposite to each other.

Specifically, in the foregoing step S3, during bending of the first tab 12 and the support plate 42, the support plate 42 is bent until an end of the connecting portion 422 farther from the bending portion 421 abuts against the substrate 41.

In this embodiment, when the end of the connecting portion 422 farther from the bending portion 421 abuts against the substrate 41, as shown in FIG. 9, the first gap G1 between the connecting portion 422 and the substrate 41 is gradually narrowed in a direction extending away from the bending portion 421; and in other words, in the direction extending away from the bending portion 421, the connecting portion 422 is inclined towards the substrate, thereby increasing a curvature of the bending portion 421 and further increasing a contact area between the bending portion 421 and the first tab 12.

It should be noted that the foregoing manufacturing method is a method for connecting the current collecting member 4 to the electrode assembly 1, and the manufacturing method may further include: forming the electrode assembly 1 and connecting the top cover assembly 3 to the current collecting member 4, to assemble the electrode assembly 1, the top cover assembly 3, and the current collecting member 4 together; and installing the electrode assembly 1 into the housing 2.

What is claimed is:

1. A current collecting member, wherein the current collecting member comprises a substrate and a support plate, the substrate extends in a direction perpendicular to a transverse direction, and the support plate extends from an outer end of the substrate in a longitudinal direction and folds back to a side of the substrate in the transverse direction; and the support plate comprises a bending portion and a connecting portion, the bending portion is connected to the substrate and bent into an arc shape, and the connecting portion extends from an end of the bending portion farther from the substrate;

a first gap is reserved between the connecting portion and the substrate, and a first gap is gradually narrowed in a direction extending away from the bending portion.

2. The current collecting member according to claim 1, wherein an end of the connecting portion farther from the bending portion comes in contact with the substrate.

3. The current collecting member according to claim 1, wherein there are two support plates, the two support plates respectively extend from both ends of the substrate in the longitudinal direction, and the two support plates are bent opposite to each other.

4. The current collecting member according to claim 3, wherein a second gap is reserved between connecting portions of the two support plates in the longitudinal direction.

5. The current collecting member according to claim 1, wherein the current collecting member further comprises a terminal connecting plate, and the terminal connecting plate is perpendicular to the substrate and connected to the substrate.

6. The current collecting member according to claim 1, wherein a cross section of the bending portion is sector-shaped.

7. The current collecting member according to claim 1, wherein the substrate and the support plate are integrally formed.

8. A secondary battery, comprising an electrode assembly, a housing, a top cover assembly, and a current collecting member, wherein the current collecting member comprises a substrate and a support plate, the substrate extends in a direction perpendicular to a transverse direction, and the support plate extends from an outer end of the substrate in a longitudinal direction and folds back to a side of the substrate in the transverse direction;

the support plate comprises a bending portion and a connecting portion, the bending portion is connected to the substrate and bent into an arc shape, and the connecting portion extends from an end of the bending portion farther from the substrate;

a first gap is reserved between the connecting portion and the substrate, and a first gap is gradually narrowed in a direction extending away from the bending portion;

the electrode assembly is accommodated in the housing and comprises a body and a first tab, and the first tab extends from an end of the body in the transverse direction;

the top cover assembly comprises a top cover plate and a first electrode terminal disposed on the top cover plate, the top cover plate is connected to the housing, and the current collecting member is connected to the first tab and the first electrode terminal;

the substrate is disposed on a side of the body in the transverse direction, and the support plate folds back to a side of the substrate farther from the body; and the first tab is connected to the connecting portion and bent along a surface of the bending portion.

9. The secondary battery according to claim 8, wherein the first tab comprises a first part, a second part, and a third part, the first part extends from an end of the body in the transverse direction, the second part extends from an end of the first part farther from the body and is bent along the surface of the bending portion, and the third part extends from an end of the second part farther from the first part and is fastened to the connecting portion.

10. The secondary battery according to claim 8, wherein an end of the connecting portion farther from the bending portion comes in contact with the substrate.

11. The secondary battery according to claim 8, wherein there are two support plates, the two support plates respectively extend from both ends of the substrate in the longitudinal direction, and the two support plates are bent opposite to each other.

12. The secondary battery according to claim 11, wherein a second gap is reserved between connecting portions of the two support plates in the longitudinal direction.

13. The secondary battery according to claim 8, wherein the current collecting member further comprises a terminal connecting plate, and the terminal connecting plate is perpendicular to the substrate and connected to the substrate.

14. The secondary battery according to claim 8, wherein a cross section of the bending portion is sector-shaped.

15. A method for manufacturing a secondary battery, wherein the secondary battery comprises an electrode assembly and a current collecting member, the electrode assembly comprises a body and a first tab, and the first tab extends from an end of the body in a transverse direction; and the manufacturing method comprises:

bending a current collecting plate to form a bending structure, wherein the bending structure comprises a substrate and a support plate that are bent toward each other, and the support plate extends from an outer end of the substrate in a longitudinal direction;

connecting the first tab to the support plate; and bending the first tab and the support plate that are connected, wherein during bending, a bending portion and a connecting portion are formed in the support plate, the bending portion is located at a bending position of the support plate and is arc-shaped, the connecting portion extends from an end of the bending portion farther from the substrate, and the substrate, the bending portion, and the connecting portion from the current collecting member; and wherein a first gap is reserved between the connecting portion and the substrate, and a first gap is gradually narrowed in a direction extending away from the bending portion.

16. The method for manufacturing a secondary battery according to claim 15, wherein during bending of the first tab and the support plate that are connected, the manufacturing method further comprises:

bending the first tab and the support plate that are connected, until an end of the connecting portion farther from the bending portion abuts against the substrate.

* * * * *